United States Patent
Hayes et al.

(10) Patent No.: US 10,076,856 B2
(45) Date of Patent: Sep. 18, 2018

(54) MANUFACTURE OF AN ARTICLE HAVING A DECORATIVE COVER SHEET OVERLYING A SUBSTRATE

(71) Applicant: International Automotive Components Group North America, Inc., Southfield, MI (US)

(72) Inventors: Marc A. Hayes, Plymouth, MI (US); Randy S. Reed, Fair Haven, MI (US)

(73) Assignee: International Automotive Components Group North America, Inc., Southfield, MI (US)

( * ) Notice: Subject to any disclaimer, the term of this patent is extended or adjusted under 35 U.S.C. 154(b) by 463 days.

(21) Appl. No.: 14/739,089

(22) Filed: Jun. 15, 2015

(65) Prior Publication Data
US 2016/0361837 A1    Dec. 15, 2016

(51) Int. Cl.
*B29B 13/02*     (2006.01)
*B29C 43/18*     (2006.01)
*B29C 69/00*     (2006.01)
*B29L 9/00*      (2006.01)
*B29C 63/02*     (2006.01)
*B29L 31/30*     (2006.01)
(Continued)

(52) U.S. Cl.
CPC .......... *B29B 13/023* (2013.01); *B29C 43/183* (2013.01); *B29C 69/007* (2013.01); *B29C 43/203* (2013.01); *B29C 63/025* (2013.01); *B29C 2043/185* (2013.01); *B29C 2043/186* (2013.01); *B29L 2009/00* (2013.01); *B29L 2031/3014* (2013.01); *B60R 13/0243* (2013.01)

(58) Field of Classification Search
CPC ........... B29B 13/023; B29L 2031/3008; B29L 2031/3014; B29L 2031/302; B29L 2009/00; B60R 13/0243; B29C 43/203; B29C 69/007; B29C 43/183; B29C 63/025; B29C 2043/186; B29C 2043/185
See application file for complete search history.

(56) References Cited

U.S. PATENT DOCUMENTS 5,324,384 A * 6/1994 Spengler ................. B29C 63/04
                                                           156/227
5,413,661 A * 5/1995 Spengler ................. B29C 51/14
                                                           100/237
(Continued)

*Primary Examiner* — Alison L Hindenlang
*Assistant Examiner* — Jerzi H Moreno Hernandez
(74) *Attorney, Agent, or Firm* — Grossman, Tucker, Perreault & Pfleger, PLLC

(57) ABSTRACT

A method of forming a decorative article comprising placing a decorative cover sheet comprising an untextured skin layer, a cushion foam layer and an adhesive layer in a mold space between a front mold half and a rear mold half, placing a substrate on the rear mold half, heating a textured front mold surface and the skin layer with a first heater arrangement between the front mold half and the cover sheet, heating the cover sheet and the substrate with a second heater arrangement between the cover sheet and the rear mold half, forming the skin layer of the decorative cover sheet into contact with the textured front mold surface, forming into the skin layer a textured surface from the textured front mold surface, pressing the substrate against the adhesive layer of the decorative cover sheet, and bonding the cover sheet to the substrate with the adhesive layer.

23 Claims, 9 Drawing Sheets

(51) Int. Cl.
*B29C 43/20* (2006.01)
*B60R 13/02* (2006.01)

(56) References Cited

U.S. PATENT DOCUMENTS

| | | | |
|---|---|---|---|
| 5,718,791 A * | 2/1998 | Spengler | B29C 51/16 100/269.07 |
| 5,759,594 A | 6/1998 | Masui et al. | |
| 5,968,437 A | 10/1999 | Harada | |
| 6,096,166 A * | 8/2000 | Liou | B29C 65/18 156/494 |
| 6,136,415 A * | 10/2000 | Spengler | B29C 44/569 264/46.6 |
| 6,508,289 B2 | 1/2003 | Hagai | |
| 6,749,794 B2 | 6/2004 | Spengler | |
| 7,997,894 B2 | 8/2011 | Schilles | |
| 8,007,270 B2 | 8/2011 | Schilles | |
| 8,012,290 B2 * | 9/2011 | Spengler | B29C 51/004 156/231 |
| 2003/0030188 A1 * | 2/2003 | Spengler | B29C 37/0032 264/458 |
| 2003/0041955 A1 * | 3/2003 | Spengler | B29C 43/203 156/221 |
| 2003/0155685 A1 * | 8/2003 | Spengler | B29C 43/36 264/250 |
| 2004/0108625 A1 * | 6/2004 | Moder | B29C 51/082 264/510 |
| 2005/0017404 A1 * | 1/2005 | Youngs | B29C 45/1418 264/255 |
| 2006/0012075 A1 * | 1/2006 | Spengler | B29C 43/36 264/320 |
| 2007/0131347 A1 * | 6/2007 | Boes | B29C 63/025 156/272.2 |
| 2009/0321002 A1 * | 12/2009 | Spengler | B29C 51/004 156/221 |
| 2013/0260112 A1 | 10/2013 | Lee et al. | |
| 2015/0321400 A1 * | 11/2015 | Preisler | B32B 5/18 264/511 |

* cited by examiner

MANUFACTURE OF AN ARTICLE HAVING A DECORATIVE COVER SHEET OVERLYING A SUBSTRATE

FIELD

The present disclosure relates to the manufacture of a decorative article, particularly functioning as an interior trim component of a motor vehicle, having a decorative cover sheet overlying a substrate.

BACKGROUND

One conventional method of providing an interior trim component of a motor vehicle involves heating a planar plastic sheet of cover material (also known as sheet-stock or roll-stock) that is pre-textured with the desired surface texture, which may particularly be a simulated leather grain. This pre-textured cover material is then drawn over a pre-shaped substrate coated with a pressure-sensitive adhesive during a male vacuum forming process, and bonded thereto by the adhesive to provide the interior trim component.

During the foregoing molding process, as the plastic sheet is stretched and drawn over the pre-shaped (three-dimensional) contour of the substrate, the pre-textured cover sheet is distorted differently at different areas, depending on the degree of stretching and molding that has taken place at the respective areas. More particularly, an area that is more deeply or extensively drawn and stretched will suffer from greater distortion and texture (grain) loss. Another problem with the foregoing process is the use of pressure sensitive adhesives, which may contain volatile organic compounds (VOCs) or reactive chemistries which are environmentally unfriendly.

In order to potentially reduce the foregoing difficulties of grain loss, U.S. Pat. No. 6,749,794 to Spengler sets forth an automobile interior trim component which includes a substrate formed or laminated onto a pre-molded cover sheet including a foam backing and a skin film having a surface texture. To start the process, the cover sheet is preheated as a planar sheet so the skin film is in a melted viscous liquid state above its melting temperature, and the foam backing remains in a solid elastic foam state below its melting temperature. The preheated cover sheet is then mechanically pre-molded by a back mold into a front mold. Pressurized air is applied through the back mold, to blow-mold the cover sheet against the front mold, so the melted skin film reproduces a surface texture of the front mold surface while the solid foam backing acts as a buffer and air barrier layer. Vacuum is also applied through the front mold surface.

In a subsequent step, the mold is opened, and the pre-molded cover sheet with a finished textured skin may be removed for further separate use, or a substrate may be molded and laminated onto the back surface of the foam backing of the molded cover sheet directly in the same molding apparatus.

In forming a substrate onto the back surface of the foam backing of the cover sheet directly in the same molding apparatus, Spengler discloses that the substrate material may be a pre-heated sheet of a composite of polyolefin fibers, such as polypropylene fibers, and natural fibers or glass fibers or polyester fibers or the like, or may be a polyurethane foam, which has been preheated by any conventionally known means and which is carried or positioned in the molding apparatus by any conventionally known means.

In order to mold and laminate the substrate onto the back surface of the foam backing, the back mold is driven upward and/or the front mold is driven downward so that the back mold presses and molds the substrate against the back surface of the foam backing of the previously molded cover sheet. During forming of the substrate, the pre-heated and at least partly melted fibers of the substrate undergo melt bonding with the still-warm or still-hot foam backing of the cover sheet, so that the substrate is integrally bonded onto the cover sheet without requiring any additional adhesive or the like therebetween.

Unfortunately, while bonding of the substrate to the cover sheet may be performed without requiring use of an adhesive, bonding of the substrate to the cover sheet necessarily requires opening and closing the mold for a second time after forming the pre-molded cover sheet, which delays the manufacturing process and increases cost. Furthermore, pressing and molding the substrate against the back surface of the foam backing of the previously molded cover sheet while the molded cover sheet is still hot may cause further reproduction of the surface texture of the front mold surface into the skin film, which may result in defects if the additional surface texture reproduction does not perfectly coincide with the first surface texture reproduction (e.g. ghost marks).

In order to avoid the sequential molding operation of Spengler, it may be possible to mold a substrate directly against the back surface of the foam without reopening and reclosing the mold, such as by forming the substrate by thermoplastic injection molding directly to the decorative cover sheet. However, to accommodate such thermoplastic injection molding, the foam backing must be made of a material which may withstand the heat and pressure of the injected polymer melt without melting or distorting.

What is needed is a manufacturing process for a decorative article which aims to overcome the aforementioned difficulties and drawbacks of the art.

SUMMARY

The present disclosure provides articles having a decorative cover sheet overlying a substrate.

According to one embodiment of the present disclosure, a method of forming a decorative article is provided which comprises placing a decorative cover sheet comprising an untextured skin layer, a cushion foam layer and an adhesive layer in a mold space between a front mold half and a rear mold half, placing a substrate on the rear mold half, heating a textured front mold surface and the skin layer with a first heater arrangement between the front mold half and the cover sheet, heating the cover sheet and the substrate with a second heater arrangement between the cover sheet and the rear mold half, forming the skin layer of the decorative cover sheet into contact with the textured front mold surface, forming into the skin layer a textured surface from the textured front mold surface, pressing the substrate against the adhesive layer of the decorative cover sheet, and bonding the cover sheet to the substrate with the adhesive layer.

According to one embodiment of the present disclosure, a method of forming a decorative article is provided which comprises providing a mold comprising a front mold half and a rear mold half to form the decorative article, the front mold half comprising a mold cavity having and a front mold surface, the front mold surface comprising a textured front mold surface; arranging the mold such that a mold space is provided between the front mold half and the rear mold half; placing a substrate on the rear mold half, the substrate having a substrate front surface; placing a decorative cover sheet in the mold space between the front mold half and the rear mold half, the decorative cover sheet comprising a untextured skin layer, a cushion foam layer and an adhesive layer; retaining the decorative cover sheet within a clamping arrangement, the decorative cover sheet oriented in the clamping arrangement such that the skin layer faces the textured front mold surface; introducing a first heater arrangement and a second heater arrangement in the mold space between the front mold half and the rear mold half, the first heater arrangement located between the front mold half and the decorative cover sheet and the second heater arrangement located between the decorative cover sheet and the rear mold half; heating the textured front mold surface of the front mold half and the skin layer of the decorative cover sheet with the first heater arrangement; heating the adhesive layer of the decorative cover sheet and the substrate front surface with the second heater arrangement; removing the first heater arrangement and the second heater arrangement from the mold space between the front mold half and the rear mold half; moving at least one of the front mold half and a rear mold half towards each other in a closing direction; bringing the skin layer of the decorative cover sheet into contact with the textured front mold surface; forming into the skin layer a textured skin surface produced from the textured front mold surface; pressing the substrate against the adhesive layer of the decorative cover sheet; and bonding the cover sheet to the substrate with the adhesive layer.

In certain embodiments, the method may include forming the skin layer of the decorative cover sheet into contact with the textured front mold surface and forming into the skin layer the textured skin surface produced from the textured front mold surface are performed while applying a vacuum to the mold cavity with the front mold half.

In at least one embodiment, after forming into the skin layer the textured skin surface produced from the textured front mold surface, the method may include terminating the vacuum applied to the mold cavity with the front mold half and applying pressurized air in excess of atmospheric air pressure to the mold cavity with the front mold half before moving at least one of the front mold half and a rear mold half away from each other in an opening direction.

In at least one embodiment, while applying pressurized air in excess of atmospheric air pressure to the mold cavity with the front mold half, the method may include applying a vacuum to the mold cavity with the rear mold half before moving at least one of the front mold half and a rear mold half away from each other in an opening direction.

In at least one embodiment, the method may further comprise moving the clamping arrangement and the decorative cover sheet towards the front mold half as the front mold half and a rear mold half move towards each other in the closing direction.

In at least one embodiment, after moving the clamping arrangement and the decorative cover sheet towards the front mold half as the front mold half and a rear mold half move towards each other in the closing direction, the method my further comprise holding the clamping arrangement stationary as the front mold half and a rear mold half move towards each other in the closing direction.

In at least one embodiment, the clamping arrangement includes a plurality of clamps wherein each of the clamps is arranged to apply a clamping force to the decorative cover sheet, and wherein the clamping force to be applied by each of the clamps to the decorative cover sheet is adjustable independent of the clamping force of each of the other clamps.

In at least one embodiment, the clamping arrangement includes a plurality of clamps wherein each of the clamps applies a clamping force to the decorative cover sheet, and wherein the clamping force of at least one of the clamps is adjusted while forming the skin layer of the decorative cover sheet into contact with the textured front mold surface.

In at least one embodiment, the clamping arrangement includes a plurality of clamps wherein each of the clamps is arranged to apply a clamping force to the decorative cover sheet, and wherein at least one of the clamps is moveable relative to the decorative cover sheet to adjust tension of the decorative cover sheet.

In at least one embodiment, the clamping arrangement includes a plurality of clamps wherein each of the clamps applies a clamping force to the decorative cover sheet, and wherein at least one of the clamps is moved relative to the decorative cover sheet while forming the skin layer of the decorative cover sheet into contact with the textured front mold surface.

In at least one embodiment, the clamping arrangement comprises an annular frame assembly which surrounds the mold.

In at least one embodiment, the mold is mounted to a molding press to open and close the mold, and the annular frame assembly is mounted to the molding press and is not mounted to the mold.

In at least one embodiment, the mold has an opening direction and a closing direction, and the annular frame assembly is movable in a same direction as either the opening direction or the closing direction of the mold while the mold is stationary.

In at least one embodiment, the annular frame assembly is movable in a direction substantially transverse to a parting line of the mold.

In at least one embodiment, the annular frame assembly includes an annular frame body and a plurality of clamps wherein each of the clamps is arranged to apply a clamping force to the decorative cover sheet, and each of the plurality of clamps comprises a clamping member, wherein the clamping member is arranged to clamp the decorative cover sheet in the presence of the clamping force applied to the clamping member.

In at least one embodiment, each of the plurality of clamps comprises a pneumatic cylinder to provide the clamping force.

In at least one embodiment, each of the plurality of clamping members comprises at least one adjustable stop to adjust the clamping force applied to the decorative cover sheet.

In at least one embodiment, each of the plurality of clamping members is mounted to the annular frame body and arranged to pivot relative to the annular frame body during clamping of the decorative cover sheet and unclamping of the decorative cover sheet.

In at least one embodiment, each of the plurality of clamping members is mounted to a movable section of the annular frame assembly such that each of the plurality of clamping members is movable in a direction towards the mold and a direction away from the mold.

In at least one embodiment, each of the plurality of clamping members is mounted to a movable section of the annular frame assembly such that each of the plurality of clamping members is movable in a direction substantially perpendicular to either an opening direction of the mold or a closing direction of the mold.

In at least one embodiment, each movable section of the annular frame assembly is movable by a pneumatic cylinder.

In at least one embodiment, each movable section of the annular frame assembly is movable along a guide track formed by the annular frame assembly.

FIGURES

The above-mentioned and other features of this disclosure, and the manner of attaining them, will become more apparent and better understood by reference to the following description of embodiments described herein taken in conjunction with the accompanying drawings, wherein:

FIG. 1A shows a cross-sectional side view of a decorative article according to the present disclosure; and FIG. 1B shows a close-up cross-sectional side view of the portion of the decorative article within circle 1B of FIG. 1A;

FIG. 2 is a cross-sectional side view of a molding apparatus used to form the decorative article of FIG. 1 in a fully open position, including a decorate cover sheet and a substrate located between in the mold space between a front mold half and a rear mold half, with a first heater arrangement located between the front mold half the decorative cover sheet and a second heater arrangement located between the decorative cover sheet and the rear mold half;

Figure 6:
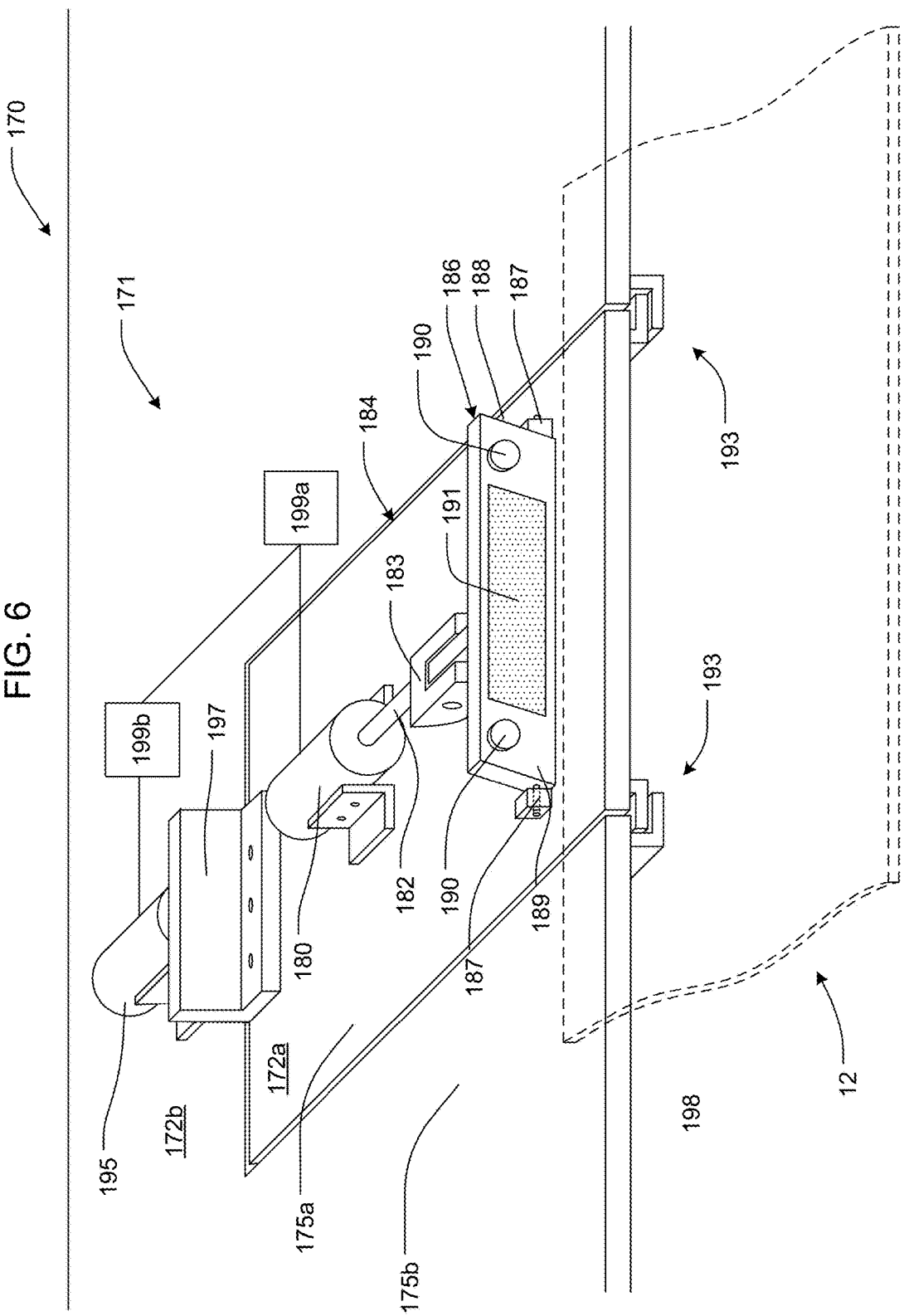
Figure 7:
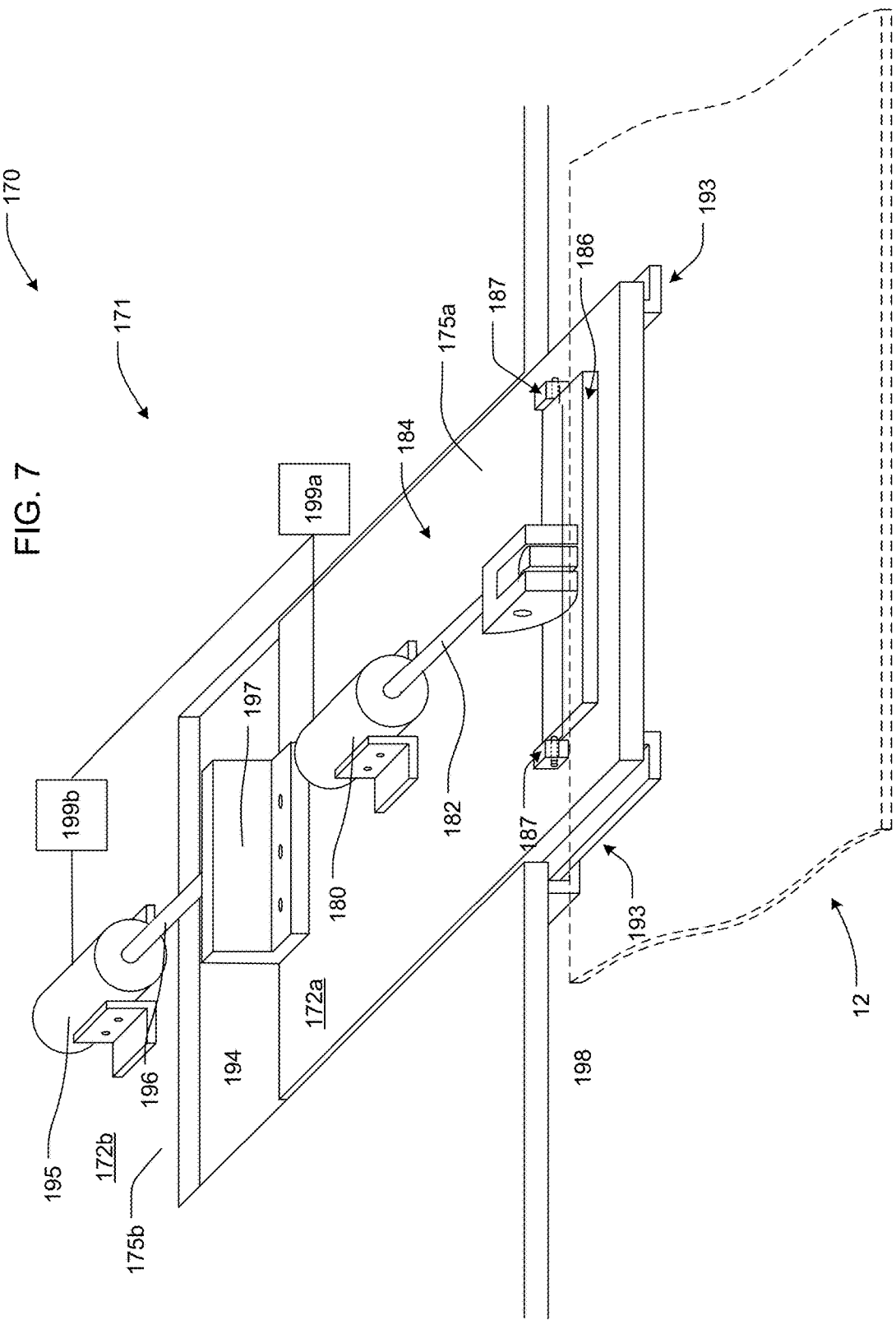

FIG. 6 is a perspective view of a section of a clamping arrangement for the decorative cover sheet comprising an annular frame assembly, with a movable inner section retracted and a clamp open; and FIG. 7 is a perspective view of the section of the clamping arrangement for the decorative cover sheet comprising the annular frame assembly of FIG. 6, with the movable inner section extended and the clamp closed.

Figure 8:
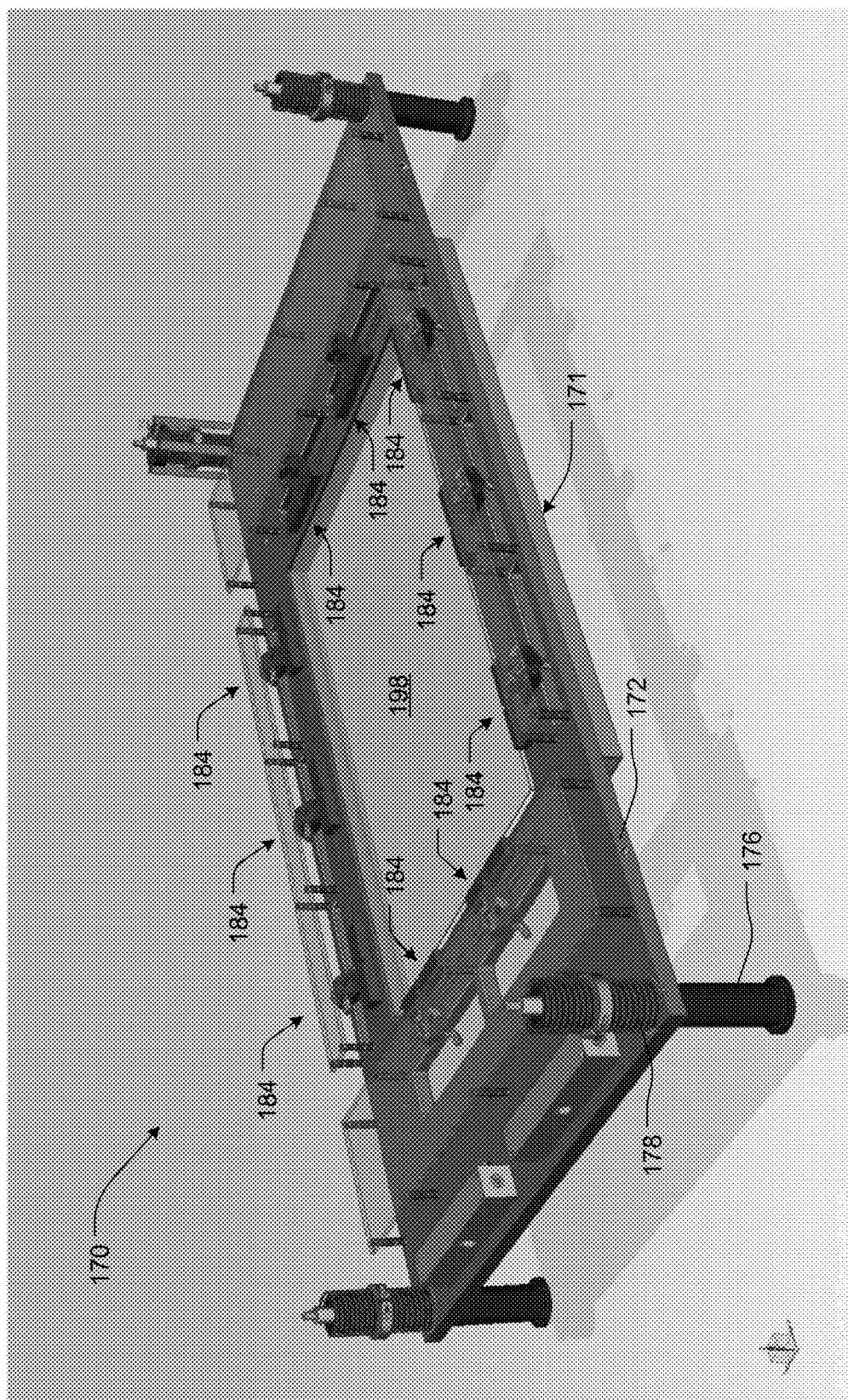
Figure 9:
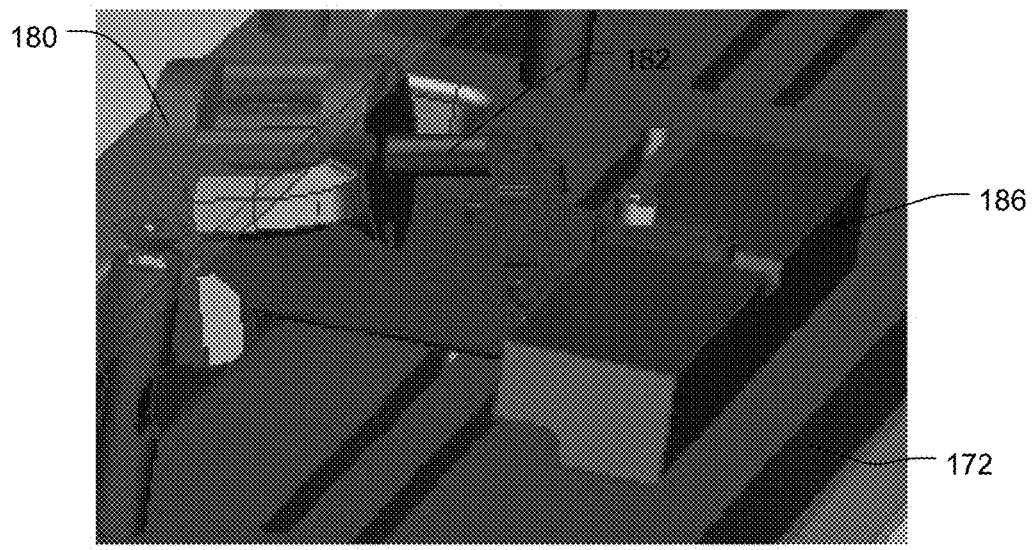
Figure 10:
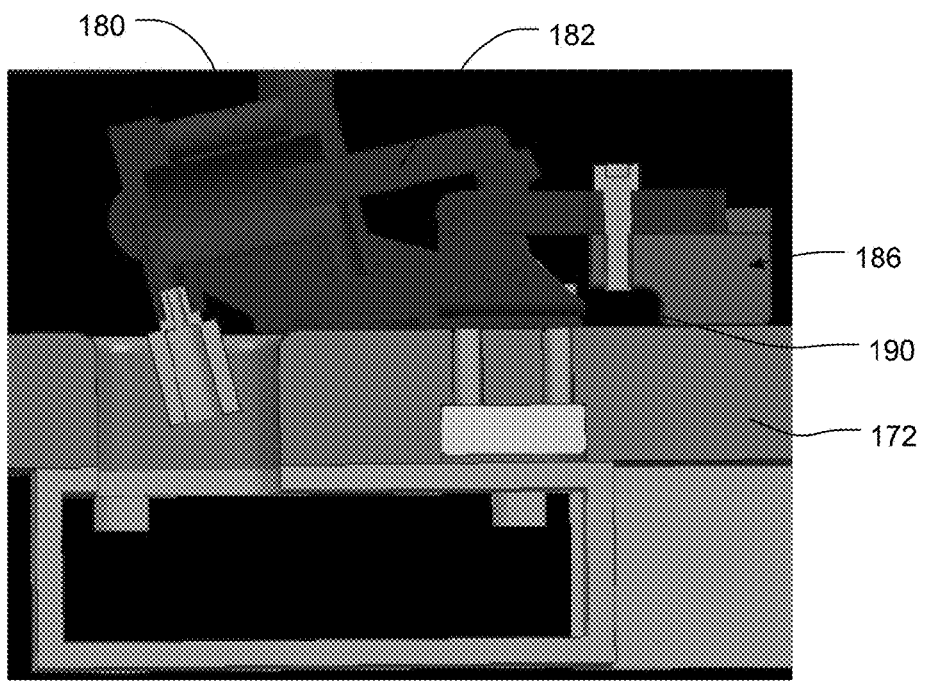

FIG. 8 is a perspective view of a clamping arrangement for the decorative cover sheet comprising the annular frame assembly including a plurality of clamps according to another embodiment of the present invention;

FIG. 9 is a close-up perspective view of a clamp of the annular frame assembly of FIG. 8; and FIG. 10 is a close-up cross-sectional view of a clamp of the annular frame assembly of FIG. 8.

DETAILED DESCRIPTION

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Figure 1A:
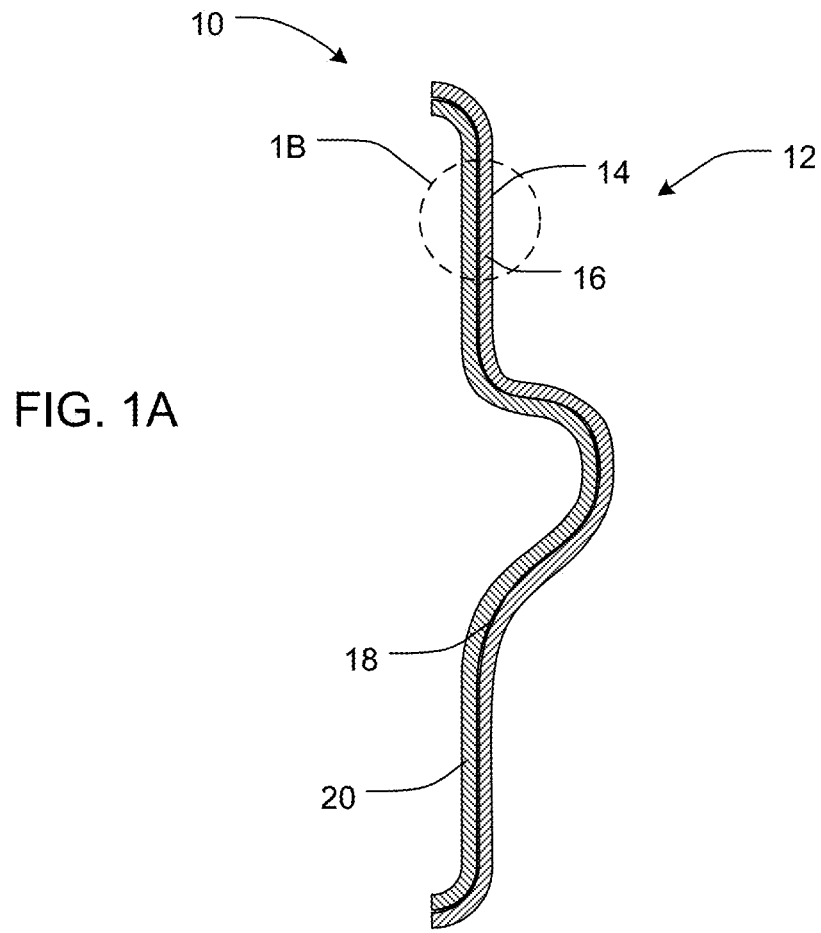
Figure 1B:
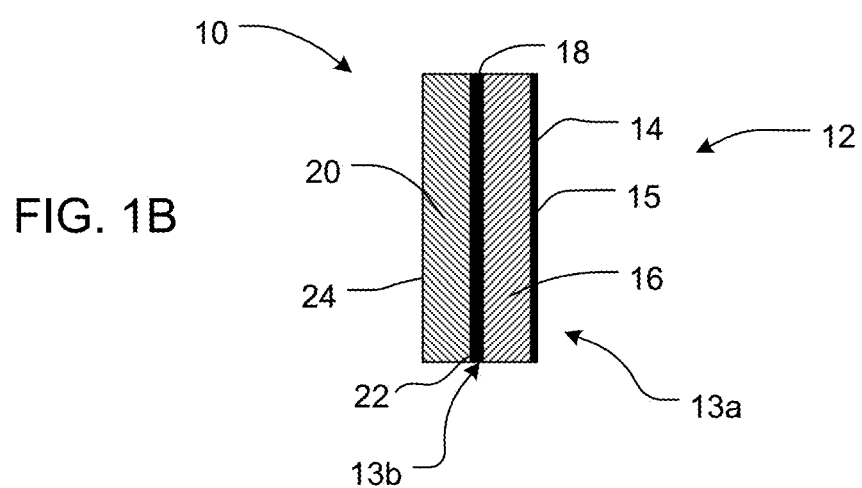

Referring now to the figures, FIGS. 1A and 1B show a decorative article 10 manufactured according to the present disclosure. As shown, decorative article 10 comprises a decorative cover sheet 12 and a substrate 20. As shown, decorative cover sheet 12 has a front side 13a and a rear side 13b, and comprises a decorative outer skin layer 14 which is bonded to a resilient cushion foam (cellular) backing layer 16, such as by roll laminating. The resilient cushion foam (cellular) backing layer 16 of the decorative cover sheet 12 is bonded to a substrate 20 during manufacture of decorative article 10 with an adhesive layer 18.

Figure 2:
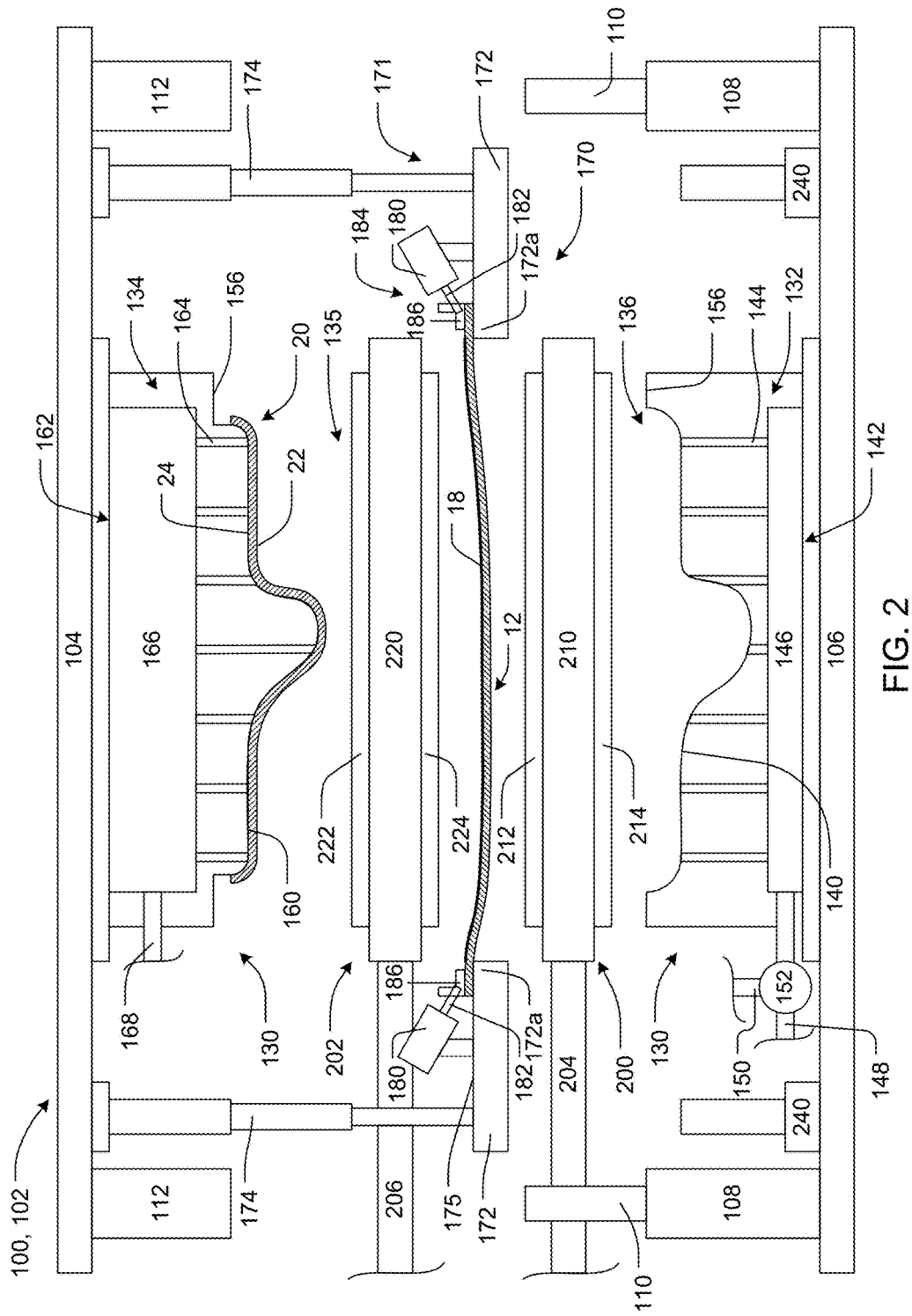

Decorative cover sheet 12 may be cut (e.g. die-cut) into planar blanks from a continuous sheet of roll-stock (which also may be referred to as sheet-stock) to provide a planar sheet of material as shown in FIG. 2. As used herein, it should be understood that the planar blanks are pieces of the roll-stock which have not yet been formed into a three-dimensional shape.

Skin layer 14 may be formed of one or more resilient synthetic polymers, which may be thermoplastic or thermoset. The group of thermoplastic polymers may include plasticized polyvinyl chloride (PVC), thermoplastic urethane (TPU), thermoplastic olefin (TPO) elastomers, polyvinyl chloride acrylonitrile-butadiene-styrene (PVC-ABS), acrylonitrile-styrene-acrylic (ASA), blended elastomeric thermoplastic polymers and thermoplastic polyolefins (ETP-TPO). The group of thermoset polymers may include polyurethane which is cross-linked.

Skin layer 14 may have a thickness in a range of 0.1 mm to 1.0 mm. A clearcoat layer (not shown), which may be formed of polyurethane, may be applied to the outer (front) surface 15 of the skin layer 14. Outer (front) surface 15 may particularly be untextured/ungrained. In other words, does not include a decorative pattern (e.g. from an embossing roller or similar), such as a simulated leather grain.

Cushion foam layer 16 may also be formed of one or more resilient synthetic polymers, which may be thermoplastic or thermoset. The group of thermoplastic polymers may include plasticized polyvinyl chloride (PVC), thermoplastic urethane (TPU), and thermoplastic olefin (TPO). The group of thermoset polymers may include polyurethane which is cross-linked.

Cushion foam layer 16 may have a thickness in a range of 1.0 mm to 2.5 mm. When formed of polyvinyl chloride foam, cushion foam layer 16 may have a density in a range of 0.4-0.7 g/cc (grams/cubic centimeter). Polyolefin foam, such as polypropylene foam, may have a lower density in a range of 0.03-0.1 g/cc, and may also be understood as a closed-cell foam. In order to better ensure the low density foam provides suitable compression and heat resistance, the polyolefin foam may be cross-linked.

The skin layer 14 and cushion foam layer 16 may be joined to one another by bonding, particularly by laminating. For example, by extruding the skin layer 14 and, while the skin layer 14 remains heated, passing the skin layer 14 through a lamination roll with the cushion foam layer 16. The skin layer 14 and cushion foam layer 16 may be understood to be generally impermeable to air transmission there through.

The skin layer 14 and the cushion foam layer 16 may be directly bonded to one another with or without use of a separate adhesive and/or adhesion promoter therebetween. If an adhesive and/or adhesion promoter is utilized, such may be applied to the cushion foam layer 16 prior to being laminated with the skin layer 14.

One particular decorative cover sheet 12 may comprise a bilaminate of skin layer 14 and foam layer 16. Skin layer 12 may be formed of ungrained polyvinyl chloride (PVC) having a thickness of 0.6 mm, while the foam layer 16 may be formed of cross-linked polypropylene foam having a thickness of 2.6 mm and a density of 0.05 g/cc. More specifically, the decorative cover sheet may be obtained from the Haartz corporation under the product designation CD391.

Decorative cover sheet 12 may further comprise an adhesive layer 18, which may comprise a hot-melt adhesive which is roll coated on the cushion foam cushion layer 16. The adhesive layer 18 may particularly be a solvent-free hot-melt adhesive. In certain embodiments, the hot-melt adhesive may comprise a reactive (moisture cure) adhesive or a thermoplastic adhesive. It should be understood that unlike a reactive adhesive which reacts to cross-link and form a thermoset adhesive which may no longer be heated and made to flow, a thermoplastic adhesive can repeatedly be heated and caused to flow followed by solidification upon cooling.

The adhesive layer 18 may be applied to the cushion foam layer 16 of decorative cover sheet 12 by the hot-melt adhesive being located in a heated trough (not shown). From the trough, the lower (rear) surface of the cushion foam layer 16 is coated with the adhesive layer 18. More particularly, the decorative cover sheet 12 is fed through an adhesive coated lower roll and a mechanically driven upper roll. The lower roll imparts a uniform adhesive coating onto the rear surface of the cushion foam layer 16. The gap between the rolls establishes adhesive application density. The adhesive layer 24 may be applied to the lower surface 18 of the decorative cover sheet 12 as a heated polymer melt.

Substrate 20 has a substrate front surface 22 and a substrate rear surface 24, and comprises a three dimensional shape formed from a thermoplastic polymer composition, such as from a high pressure (two stage) injection molding process, particularly with a nominal wall thickness in a range of 1 mm to 3 mm, and more particularly in a range of 2 mm to 2.5 mm. Substrate 20 may also include vacuum holes (not shown) formed therein which enable vacuum to be drawn through the substrate 20. As used herein, a three dimensional shape may be understood to have a contour which varies in three dimensional planes.

The substrate 20 may be formed of a thermoplastic polymer composition having a flexural modulus as measured in accordance with ASTM D-790-10 of at least 150,000 psi. at room temperature (23° C.) in order for substrate to provide sufficient rigidity to support article 10. More particularly, the substrate 20 may have a flexural modulus as measured in accordance with ASTM D-790-10 in a range of 150,000-400,000 psi. at 23° C.

In addition to providing sufficient rigidity for substrate 20 of article 10, the composition for substrate 20 should also provide suitable heat resistance. As such, the substrate 20 may be formed of a polymer composition having a heat distortion temperature as measured in accordance with ASTM D-648-07 of at least 82° C. at 264 psi. More particularly, the substrate 20 may have a heat distortion temperature as measured in accordance with ASTM D-648-07 in a range of 82-110° C. at 264 psi.

The polymer composition may comprise, essentially consist of or consist of a thermoplastic polymer such as polypropylene (PP), acrylonitrile-butadiene-styrene (ABS), polycarbonate (PC), polycarbonate/acrylonitrile-butadiene-styrene (PC/ABS) or polyphenylene oxide (PPO).

In addition, the polymer composition for the substrate 20 may include one or more chemical blowing agents which decompose during the injection molding process to produce a gas such that the substrate 20 will be formed with a cellular (foamed) structure. In this manner, the weight of the substrate 20 may be reduced.

Referring now to FIG. 2, there is shown a molding apparatus 100 to mold decorative article 10 according to the present disclosure. As shown, molding apparatus 100 comprises a molding press 102 having an upper horizontal platen 104 and a lower horizontal platen 106, with the upper platen 104 being vertically movable towards and away from the lower platen 106, which may particularly be stationary. Molding press 102 may further include four corner posts 108, including leader pins 110 and leader pin bushings 112 to guide opening and closing of the platens 104, 106 relative to one another.

Within molding press 102 of molding apparatus 100, molding apparatus 100 further comprises a mold set 130 comprising a front (first) mold half 132 and a rear (second) mold half 134. Front mold half 132 and a rear mold half 134 are closeable together to form the decorative article 10, and separable at a horizontal parting line 156. Front mold half 132 may be understood to be located at the front "class A" surface of decorative article 10 when decorative article 10 is being formed, while rear mold half 134 may be understood to be located at the rear "class B" surface of decorative article 10 when decorative article 10 is being formed (which faces the vehicle sheet metal).

As shown, front mold half 132 more particularly comprises a female mold half. Front mold half 132 comprises a textured front mold surface 140, which may simulate a natural leather grain. Front mold half 132 may further comprise an air manifold 142 comprising a plurality of air passages 144 which branch from internal air chamber 146 and extend to the textured mold surface 140. Internal air chamber 146 may be coupled (in fluid communication) to a vacuum (negative air pressure) source 148 or a compressed air (positive air pressure) source 150 by operation of valve 152. Front mold half 132 may also include an internal heating fluid (liquid) temperature control circuit coupled to an external heater.

Rear mold half 134 more particularly comprises a male mold half. Rear mold half 134 comprises a rear mold surface 160, as well as an air manifold 162 comprising a plurality of air passages 164 which branch from internal air chamber 166 and extend to the rear mold surface 160. Internal air chamber 162 may be coupled (in fluid communication) to a vacuum (negative air pressure) source 168. Rear mold half 134 may also include an internal heating fluid (liquid) temperature control circuit coupled to an external heater.

During initiation of the molding process, the substrate 20 is first placed on the rear mold half 134 with a rear surface 24 of the substrate 20 facing the rear mold surface 160 and the substrate 20 being retained on the rear mold half 134 in a known manner, such as by being mechanically locked in place. More particularly, the rear mold half 134 supports the substrate 20 and inhibits deformation of the substrate 20 during formation of the decorative cover sheet 12 during molding. Rear mold half 134 may comprise a male thermo-forming/vacuum-forming mandrel and may heat the substrate 20 as may be required for use of the adhesive 18.

As shown, molding apparatus 100 further includes a decorative cover sheet clamping arrangement 170 to retain a planar blank of the decorative cover sheet 12 during molding of the decorative article 12.

During initiation of the molding process, the decorative cover sheet 12 is clamped around its perimeter by the clamping arrangement 170 such that the decorative cover sheet 12 is located between the front mold surface 140 and the substrate front surface 22, with the skin layer 14 facing the front mold surface 140 and the foam backing layer 16 facing the substrate front surface 22.

As shown, decorative cover sheet clamping arrangement 170 comprises an annular frame assembly 171 which is carried at each corner support a pneumatic air cylinder 174 mounted to the upper platen 104. The annular frame assembly 171 comprises an annular frame body 172 and a plurality of clamps 184 wherein each of the clamps 184 applies a clamping force to the decorative cover sheet 12. More particularly, each clamp 184 comprises a clamping member 186 arranged to clamp the decorative cover sheet 12 against the annular frame body 172 in the presence of a clamping force provided by a pneumatic air cylinder 180.

As shown, pneumatic air cylinders 180 each have a piston rod 182 which is mechanically coupled to a clamping member 186. More particularly, piston rod 182 is arranged to extend with a force to clamp the decorative cover sheet 12 between the clamping member 186 and inner peripheral section 172a of the annular frame body 172, as well as retract to unclamp the decorative cover sheet 12. The plurality of clamps 184 are arranged around the annular frame body 172, preferably on all four sides of the perimeter of decorative cover sheet 12.

Recognizing that it may be desirable to vary the clamping characteristics of the decorative cover sheet 12 around the perimeter thereof from one location to another, each of the clamps 184, and more particularly the piston rod 182 of pneumatic air cylinders 180, may apply a clamping force to the decorative cover sheet 12 wherein the clamping force applied by each clamp 184 to the decorative cover sheet 12 is adjustable independent of the clamping force of each of the other clamps 184, particularly by varying the force applied by each pneumatic air cylinder 180. Furthermore, in addition to the force applied by each clamp 184 to the decorative cover sheet 12 being adjustable independent of the clamping force of each of the other clamps 184, the force applied by each clamp 184 to the decorative cover sheet 12 may be adjustable during the molding process.

Mold apparatus 100 further includes a first heater arrangement 200 and a second heater arrangement 202. As shown, first heater arrangement 200 may be extended into and retracted from the mold space 135 between the front mold half 132 and the rear mold half 134 by a first arm 204, while second heater arrangement 202 may be extended into and retracted from the mold space 135 between the front mold half 132 and the rear mold half 134 by a second arm 206. Arms 204 and 206 may be operated independent of one another.

As shown, when molding press 102 of molding apparatus 100 is fully open, pneumatic air cylinders 174 are fully extended, and a planar blank of decorative cover sheet 12 (including adhesive 18) is loaded in clamping arrangement 170, the first heater arrangement 200 may be located in the open mold space 135 between the decorative cover sheet 12 and the front mold half 132, while the second heater arrangement 202 may be located in the open mold space 135 between the decorative cover sheet 12 and the substrate 20/rear mold half 134.

The first heater arrangement 200 further comprises an insulator 210 disposed between a first (upper) heater 212 and a second (lower) heater 214. As shown, the first (upper) heater 212 is particularly arranged to heat the skin layer 14 of the decorative cover sheet 12, particularly front skin surface 15, while the second (lower) heater 214 is arranged to particularly heat the front mold half 132, particularly textured mold surface 140.

The second heater arrangement 202 further comprises an insulator 220 disposed between a first (upper) heater 222 and a second (lower) heater 224. As shown, the first (upper) heater 222 is particularly arranged to heat the substrate 20, particularly substrate front surface 22, while the second (lower) heater 224 is particularly arranged to heat the adhesive layer 18 on the back of decorative cover sheet 12.

With regards to the molding process, as set forth above, after molding press 102 is fully opened and pneumatic air cylinders 174 are fully extended, a substrate 20 is placed on the rear mold half 134 with a rear surface 24 of the substrate 20 facing the rear mold surface 160 and the substrate 20 being retained on the rear mold half 134 in a known manner. Thereafter, a blank of decorative cover sheet 12 (including adhesive 18) is loaded in clamping arrangement 170 and clamped thereby.

Once the substrate 20 and the decorative cover sheet 12 have been loaded, the first heater arrangement 200 and a second heater arrangement 202 are introduced to the mold space 135 between the front mold half 132 and the rear mold half 134 by extending arms 204, 206, respectively. More particularly, the first heater arrangement 200 is, located in the mold space 135 between the front mold half 132 and the cover sheet 12, while the second heater arrangement 202 is located in the mold space 135 between the cover sheet 12 and the rear mold half 134.

Once the first heater arrangement 200 and the second heater arrangement are positioned in the mold space 135 between the front mold half 132 and the rear mold half 134, they both may be immediately activated.

With regards to first heater arrangement 200, the skin layer 14 of the decorative cover sheet 12, particularly front skin surface 15, may be heated with the first (upper) heater 212, while the front mold half 132, particularly textured mold surface 140, may be heated with the second (lower) heater 214.

More particularly, the first (upper) heater 212 may heat the skin layer 14 side of the decorative cover sheet 12 to a temperature in a range of 135-180° C. for a time period of 15-30 seconds, while the second (lower) heater 214 may heat the textured mold surface 140 to a temperature in a range of 75-90° C. for a time period of 15-30 seconds.

With regards to the second heater arrangement 202, the substrate 20, particularly substrate front surface 22, may be heated with the first (upper) heater 222, while the adhesive layer 18 on the back of decorative cover sheet 12 may be heated with the second (lower) heater 224.

More particularly, the first (upper) heater 222 may heat the substrate 20 to a temperature in a range of 65-105° C. for a time period of 15-30 seconds, while the second (lower) heater 224 may heat the adhesive layer 18 side of the decorative cover sheet 12 to a temperature in a range of 145-225° C. for a time period of 15-30 seconds.

Furthermore, the front mold half 132 may be heated with the internal heating fluid (liquid) temperature control circuit to a temperature in a range of 75-90° C. Similarly, the rear mold half 134 may be heated with the internal heating fluid (liquid) temperature control circuit to a temperature in a range of 35-60° C.

After the substrate 20, decorative cover sheet 12 and textured mold surface 140 have been adequately heated, the first heater arrangement 200 and a second heater arrangement 202 are removed from the mold space 135 between the front mold half 132 and the rear mold half 134 by retracting arms 204, 206, respectively.

Once the first heater arrangement 200 and a second heater arrangement 202 are removed from the mold space 135, the molding press 102 then begins to close, particularly with the upper platen 104 moving towards the lower platen 106, such that the rear mold half 134 and the clamping arrangement 170 move towards the front mold half 132. In other embodiments, the front mold half 132 may move towards the rear mold half 134 or both the front mold half 132 and the rear mold half 134 may move towards one another.

Figure 3:
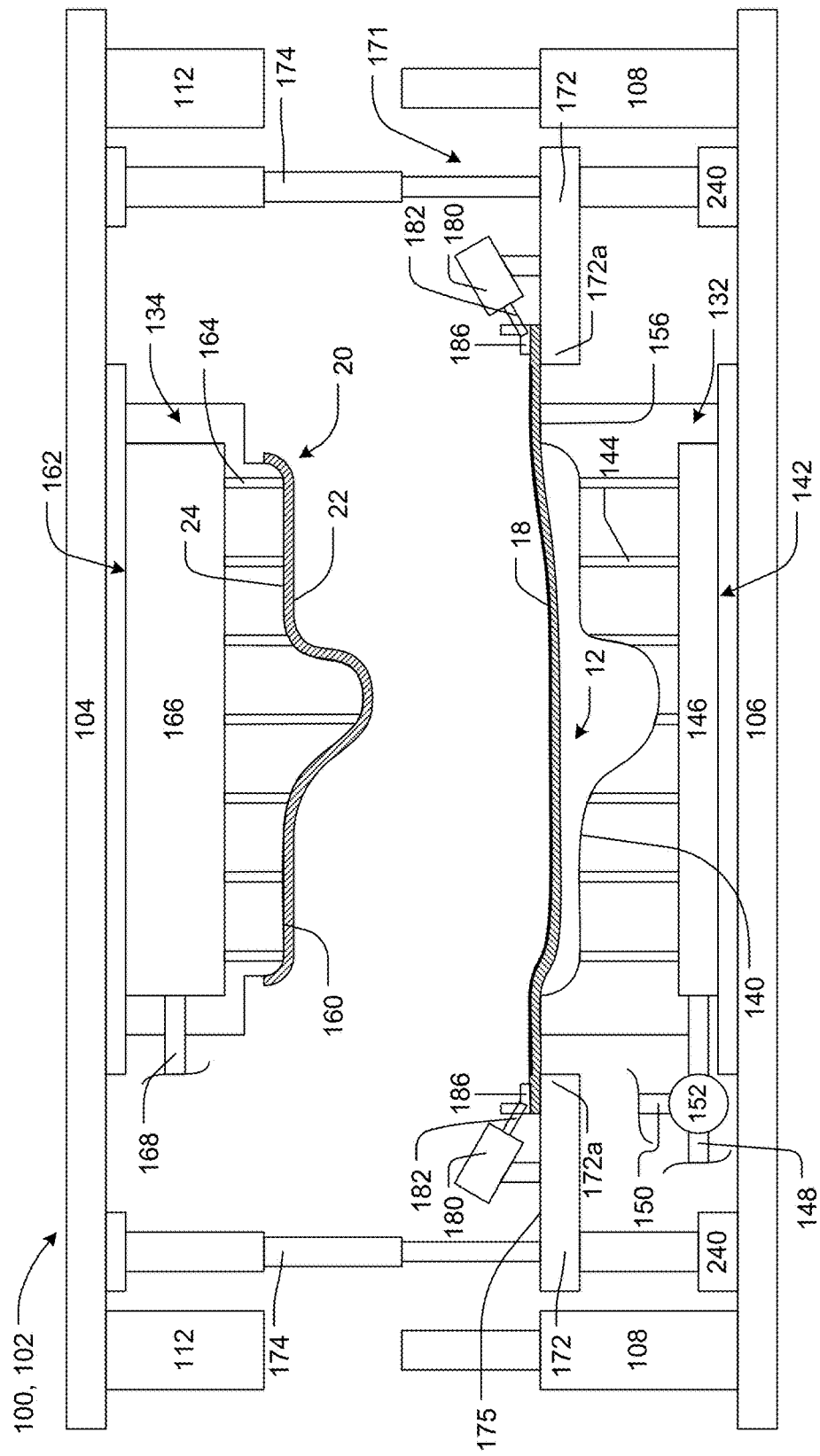
FIG. 3 is a cross-sectional side view of a molding apparatus of FIG. 2 used to form the decorative article of FIG. 1, with the molding apparatus partially closed with the decorative cover sheet initially making contact with the front mold half.

Referring now to FIG. 3, about the same time or immediately prior to the bottom of frame assembly 172 of clamping arrangement 170 makes contact with frame assembly stops 240, the decorative cover sheet 12 makes contact with the perimeter parting line 156 of front mold half 132 and seals with the perimeter parting line as a vacuum is drawn through air passages 144 and internal air chamber 146 of manifold 142. At this point, the frame assembly stops 240 inhibit the annular frame assembly 171 from further vertical travel as the mold 130 continues to close. As shown, the annular frame assembly 171 travels vertically with closure of the mold 130 until the upper surface 175 of the annular frame body 172 is within 2 inches, and more particularly within 1 inch, of being parallel with the perimeter parting line 156 of front mold half 132 to minimize undesirable stretching of the decorative cover sheet 12 outside the mold 130 (as shown the surfaces are parallel).

Figure 4:
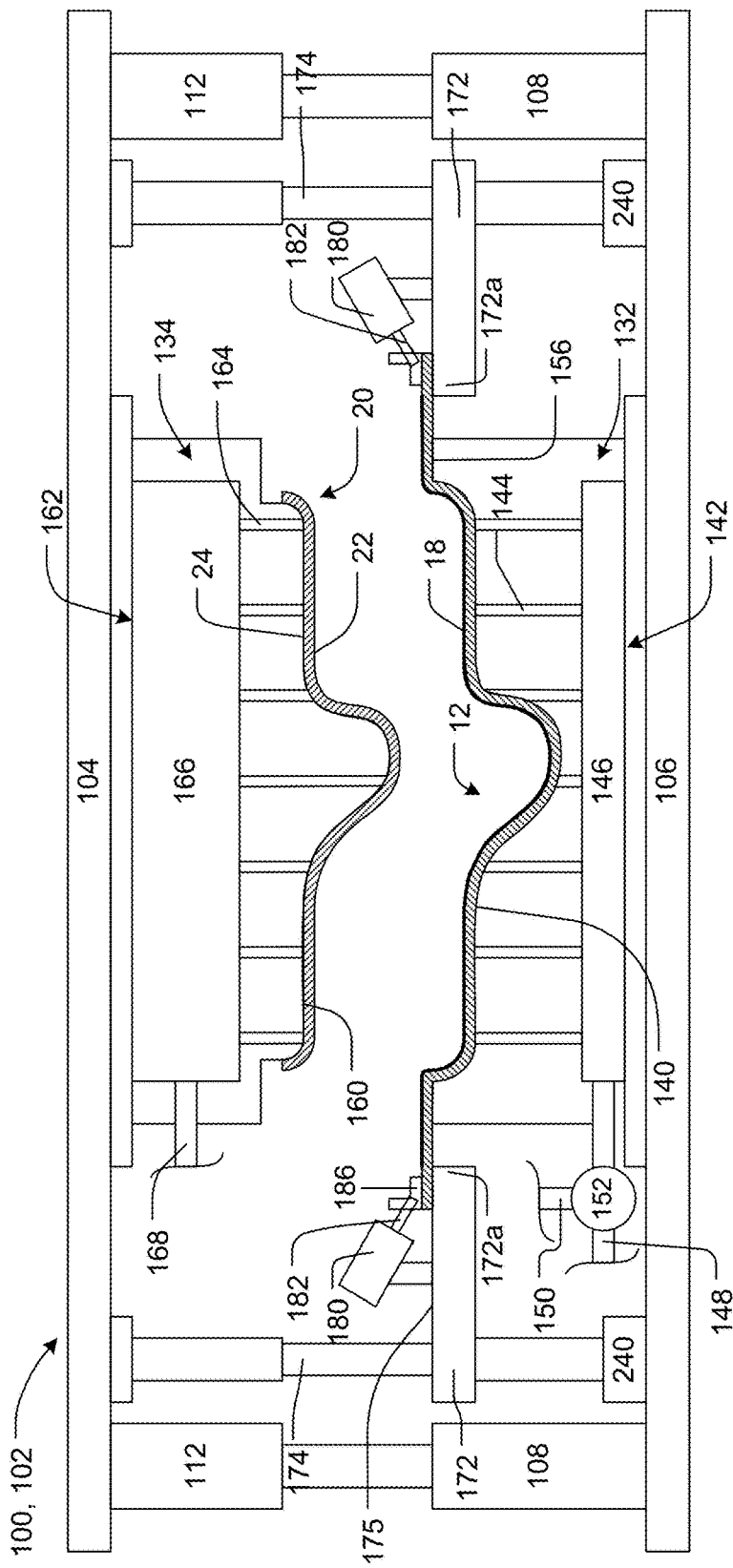
FIG. 4 is a cross-sectional side view of a molding apparatus of FIG. 2 used to form the decorative article of FIG. 1, with the molding apparatus partially closed with the decorative cover sheet formed to the shape of the textured mold surface of the front mold half.

As a result, as shown in FIG. 4, the decorative cover sheet 12 is drawn and molded into the mold cavity 136. More particularly, as the decorative cover sheet 12 is being drawn into the mold cavity 136, the decorative cover sheet 12 is stretched such that the skin layer 14 is brought into contact with the textured front mold surface 140 so as to form into the skin layer 14 a textured surface from the textured front mold surface 140, particularly with a depth of up to 0.25 mm (0.01 inch).

Figure 5:
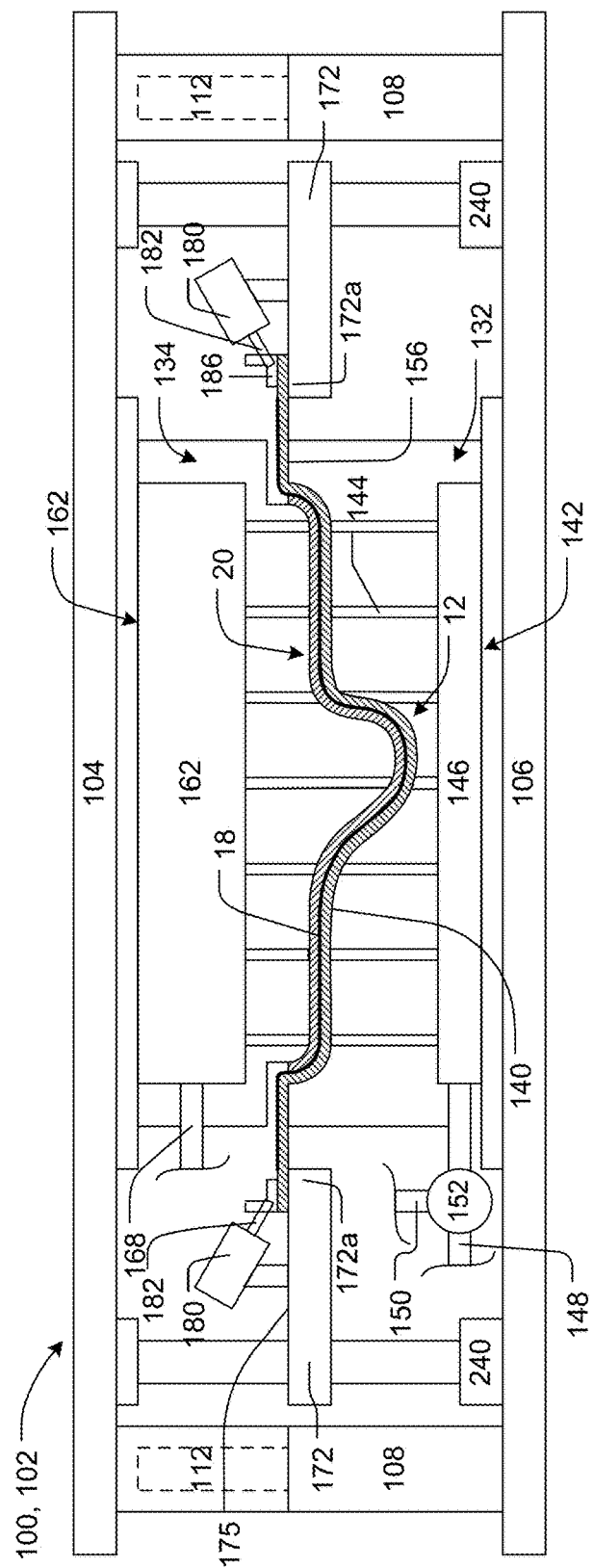
FIG. 5 is a cross-sectional side view of a molding apparatus of FIG. 2 used to form the decorative article of FIG. 1, with the molding apparatus fully closed with the decorative cover sheet formed to the shape of the textured mold surface of the front mold half and the substrate pressed against the decorative cover sheet.

As shown in FIG. 5, as the molding apparatus 100 and the mold 130 continue to close, the substrate 30 enters the mold cavity 136 such that substrate 30 presses against the decorative cover sheet 12. More particularly, the substrate front surface 22 makes contact with the adhesive layer 18 and thereafter, as the substrate 30 continues to move with the closure of mold 130, the substrate 30 compresses the cushion foam (cellular) backing layer 16, which biases the compression force. The compression pressure may be in a range of 5-40 psi., and more particularly in a range of 15-30 psi.

To better ensure the textured is formed into the upper (front) surface 15 of the skin layer 14, as well as increase the bonding of the decorative cover sheet 12 and the substrate 20 to one another, at full mold closure, the thickness of mold cavity 136 between the front mold half 132 and the rear mold half 134 should be such that the cushion foam (cellular) backing layer 16 is pressed (compressed) at least 10%, and more particularly compressed in a range of 10% to 50%. In order to provide suitable resistance to compression, the cushion layer 16 should have a compressive strength of 0.40-0.45 kg/cm$^2$ at an indentation of 50%, measured ASTM D3575-11, Part B. By heating the skin layer 14 of decorative cover sheet 12 to 135-180° C., the material temperature is suitable for female vacuum forming the sheet and compressive molding to impart a grain depth of up to 0.010" inch.

After forming the textured surface into the skin layer 14 and while the mold 130 is closed, a vacuum may be applied through the rear mold half 134, while simultaneously terminating the vacuum through the front mold half 132 and applying positive air pressure through the front mold half 132, to demold the molded decorative article 10 from the mold cavity 136, as well as increase the bond between the decorative cover sheet 12 and the substrate 20, to the extent the adhesive 18 has not cooled and the bond is not fully set.

Once the adhesive has set, particularly by being cooled below a solidification temperature in the case of a hot-melt such that a stable bond forms between the decorative cover sheet 12 and the substrate 20, the front mold half 132 and rear mold half 134 may be opened and the decorative article 10 demolded.

In a variant of the foregoing molding process, the vacuum may not be drawn through air passages 144 and internal air chamber 146 of manifold 142 of the front mold half 132 until the mold 130 has been closed sufficiently such that the substrate 20 has made contact with the decorative cover sheet 12 and begins to push the decorative cover sheet 12 into the mold cavity. In this manner, the decorative cover sheet 12 may stretch in a more uniform manner with less thinning in high draw areas than the prior embodiment where the decorative cover sheet 12 is drawn into the mold cavity 136 with vacuum prior to the substrate 20 making contact with the decorative layer 12.

In another variant of the foregoing molding process, the clamping force of at least one of the clamps 184 may be adjusted while forming the skin layer 14 of the decorative cover sheet 12 into contact with the textured front mold surface 140.

In another variant of the foregoing molding process, an adhesive may be applied to the front surface 22 of the substrate in addition to or alternatively to the adhesive layer 18 being provided with the decorative cover sheet 12. The adhesive, once applied to the front surface 22 of the substrate 20 may then be cooled on the substrate 20 to a temperature (e.g. room temperature or 20-23° C.) to solidify the liquid melt.

In addition to providing the foregoing molding processes in which the decorative cover sheet 12 and substrate 20 may be bonded to one another in a single mold closing step, the foregoing molding processes may be understood to also enable a thermoplastic adhesive with a much higher melt temperature to be utilized in bonding the decorative cover sheet 12 and substrate 20.

As set forth herein, heating of the decorative cover sheet 12 and the substrate is performed within the confines of the mold space 135 between the front mold half 132 and the rear mold half 134.

In contrast, in a situation where a cover sheet is heated outside the mold space between mold halves, the cover sheet must be shuttled in between the mold halves after heating. During the shuttling of the cover sheet between the mold halves, the cover sheet may be understood to cool substantially, due to its low mass and the airflow around the moving cover sheet. As such, in order for a hot-melt adhesive to remain in the melt state, it becomes necessary to have the hot-melt adhesive heated substantially above its melt temperature to ensure that the hot melt possesses sufficient residual heat to remain a melt during bonding of the cover sheet to the substrate. In other words, to provide sufficient time for the hot-melt adhesive to remain above its melt temperature before bonding the cover sheet to the substrate to one another.

However, the temperature to which the hot-melt adhesive is heated is limited by the processing temperatures of the skin layer 14 and the cushion foam layer 16. As such, in order for the hot melt adhesive to possess sufficient residual heat to remain as a melt during bonding of the cover sheet to the substrate, without the hot melt adhesive being heated to a temperature which may damage the skin layer 14 and/or the cushion foam layer 16, the melt temperature of the hot-melt adhesive must be decreased. Unfortunately, the decrease in melt temperature of the hot-melt reduces high-temperature bonding performance of the hot-melt adhesive. As a result, in order to increase the high-temperature bonding performance of the hot-melt adhesive, the hot melt adhesive may be made to react into a thermoset.

Unfortunately, thermoset adhesives are less desirable than thermoplastic adhesives given the inability of the thermoset adhesive to be easily recycled with the application of heat. However, by heating of the decorative cover sheet 12 and the substrate within the confines of the mold space 135 between the front mold half 132 and the rear mold half 134 with the process disclosed herein, the decorative cover sheet 12 has less time to cool in the time period between the time of retraction of the first and second heater arrangements 200 and full mold closure of the front and rear mold halves 132, 134.

As such, given the decrease in cooling time, and the associated decrease in temperature drop of the decorative cover sheet 12 associated with the decorative cover sheet 12 and the substrate being heated within the confines of the mold space 135 as opposed to being heated outside the mold space 135, the melt temperature of the adhesive being used may be increased such that a thermoplastic adhesive may be used in contrast to a reactive hot-melt. Examples of thermoplastic hot-melt adhesives include thermoplastic olefins and thermoplastic urethanes which may have a melt temperature of at least 145° C., and more particularly a melt temperature of at least 165° C.

A second embodiment of a decorative cover sheet clamping arrangement 170, and more particularly, an annular frame assembly 171 is shown in FIGS. 6 and 7. Similar to the first embodiment, the second embodiment comprises an annular frame body 172 and a plurality of clamps 184 wherein each of the clamps 184 applies a clamping force to the decorative cover sheet 12. As with the first embodiment, each clamp 184 comprises a clamping member 186 arranged to clamp the decorative cover sheet 12 against the annular frame body 172 in the presence of a clamping force provided by a pneumatic air cylinder 180.

As shown, pneumatic air cylinders 180 which each have a piston rod 182 which is mechanically coupled to a clamping member 186 by a linkage 183. More particularly, piston rod 182 is arranged to extend with a force to clamp the decorative cover sheet 12 between the clamping member 186 and inner peripheral section 172*a* of the annular frame body 172, as well as retract to unclamp the decorative cover sheet 12. The plurality of clamps 184 are arranged around the annular frame body 172, preferably on all four sides of the perimeter of decorative cover sheet 12.

Unlike the first embodiment, with the second embodiment, the clamping member 186 is mechanically (pivotably hinged) mounted to the inner peripheral section 172*a* of the annular frame body 172, particularly by hinges 187. However, it should be recognized that the clamping member 186 of the first embodiment may also be pivotably (hinged) connected to the inner peripheral section 172*a* of the annular frame body 172, particularly by hinges 187.

As shown, clamping member 186 may include a clamp plate 188 having an inner clamp face 189 including at least one adjustable stop 190. Adjustable stops 190 may be rotated relative to clamp plate 188 (by threaded engagement) to increase or decrease the clamping force applied to the decorative cover sheet 12. Inner clamp face 189 may also include a textured surface 191 to enhance clamping of the decorative cover sheet 12.

Also unlike the first embodiment, inner peripheral section 172*a* of the annular frame body 172 is moveable relative to an outer (stationary) peripheral section 172*b* of the annular frame body 172. As shown, the inner peripheral section 172*a* of the annular frame body 172 is separate from the outer peripheral section 172*b* of the annular frame body 172, and movable laterally within opening 194 relative to the outer peripheral section 172*b* of the annular frame body 172 (i.e. laterally towards and away from center of the annular frame assembly 171) on guide tracks 193.

Inner peripheral section 172*a* of the annular frame body 172 is made movable laterally relative to the outer peripheral section 172*b* of the annular frame body 172 by a second pneumatic air cylinder 195. As shown, pneumatic air cylinder 195 is arranged to move each clamp 184 including the pneumatic air cylinder 180 located on inner peripheral section 172*a* of the annular frame body 172. More particularly, as shown, pneumatic air cylinder 195 is mounted to the outer peripheral section 172*b* of the annular frame body 172 with a L-shaped angle bracket, while pneumatic air cylinder 180 is mounted to inner peripheral section 172*a* of the annular frame body 172, also with an L-shaped angle bracket.

As shown, pneumatic air cylinders 195 each have a piston rod 196 which is mechanically coupled to a push/pull bar 197 mounted to inner peripheral section 172*a* of the annular frame body 172. More particularly, piston rod 196 is arranged to extend with a force to move each clamp 184 including the pneumatic air cylinder 180 located on inner peripheral section 172*a* of the annular frame body 172 laterally into the center opening 198 of the annular frame assembly 171 (occupied by mold set 130 and cover sheet 12), as well as retract with a force to move each clamp 184 including the pneumatic air cylinder 180 located on inner peripheral section 172*a* of the annular frame body 172 laterally away from the center opening 198 of the annular frame assembly 171.

In the foregoing manner, pneumatic air cylinders 195 may be used to move clamps 184 laterally outward or inward relative to the decorative cover sheet 12 to adjust (increase or decrease) the tension placed on the decorative cover sheet 12 during the molding process. Here, moving clamps 184 laterally outward or inward relative to the decorative cover sheet 12 to adjust (increase or decrease) the tension placed on the decorative cover sheet 12 may be understood as moving the clamps 184 substantially transverse (perpendicular) to the opening and closing direction of molding apparatus 100 or mold 130, or moving the clamps substantially parallel to the horizontal parting line of the mold 130. With reference to the decorative cover sheet 12, moving clamps 184 laterally outward or inward relative to the decorative cover sheet 12 to adjust (increase or decrease) the tension placed on the decorative cover sheet 12 may be understood as moving the clamps 184 substantially parallel to the front side 13*a* or rear side 13*b* of the decorative cover sheet 12 being held by the clamps 184. As used herein, substantially parallel or perpendicular may be understood as being within 10 degrees of being parallel or perpendicular.

During the molding process, in the event the decorative cover sheet 12 sags too much under its own weight (e.g. as a result of being heated or otherwise) or is otherwise not taut enough, at least one of the plurality of pneumatic air cylinders 195 may move at least one of the clamps 184 laterally outward relative to the decorative cover sheet 12, particularly to increase the tension force placed on the decorative cover sheet 12 during the molding process. Conversely, in the event the decorative cover sheet is too taut, at least one of the plurality of pneumatic cylinders 195 may move one of the at least one clamps 184 laterally inward relative to the decorative cover sheet 12, particularly to decrease the tension force placed on the decorative cover sheet 12 during the molding process.

Also, as shown, the upper surface 175*a* of inner peripheral section 172*a* of the annular frame body 172 is within 1 inch, and more particularly within 0.5 inch, of being parallel upper surface 175*b* of outer peripheral section 172*b* of the annular frame body 172 to minimize distortion of the decorative cover sheet 12 at the transition there between (as shown the surfaces are parallel).

Control of the pneumatic cylinders 180, 195 may be performed with micro-processor controllers 199*a*, 199*b*, which may control, applied forces, operation rates, and operation times, etc. The controllers 199*a*, 199*b* may be operated independently or may be integrated.

Referring now to FIGS. 8-10, there is shown another embodiment of a clamping arrangement 170 comprising an annular frame assembly 171 having a plurality of clamps 184 according to the present disclosure. In contrast to the embodiment shown in FIG. 2, the annular frame assembly 171 is not carried by a plurality of pneumatic air cylinders 174 mounted to the upper platen 104, but rather supported on four corner posts 175 mounted to the lower platen 106 (for clarity, both the molding press 102 and the mold 130 are not shown). In order to move the annular frame assembly 171 vertically, the frame assembly 171 may move vertically on the corner posts 176, particularly against the resistance (bias) of coil springs 178.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

What is claimed is:

1. A method of forming a decorative article comprising:
providing a mold comprising a front mold half and a rear mold half to form the decorative article, the front mold half comprising a mold cavity and a front mold surface, the front mold surface comprising a textured front mold surface;
arranging the mold such that a mold space is provided between the front mold half and the rear mold half;
placing a substrate on the rear mold half, the substrate having a substrate front surface, and wherein the substrate has a three dimensional shape formed in another mold prior to being placed on the rear mold half;
placing a decorative cover sheet in the mold space between the front mold half and the rear mold half, the decorative cover sheet comprising an untextured skin layer, a cushion foam layer and an adhesive layer;
retaining the decorative cover sheet with a clamping arrangement, the decorative cover sheet oriented in the clamping arrangement such that the skin layer faces the textured front mold surface;
introducing a first heater arrangement and a second heater arrangement in the mold space between the front mold half and the rear mold half, the first heater arrangement located between the front mold half and the decorative cover sheet and the second heater arrangement located between the decorative cover sheet and the rear mold half;
heating the textured front mold surface of the front mold half and the skin layer of the decorative cover sheet with the first heater arrangement;
heating the adhesive layer of the decorative cover sheet and the substrate front surface with the second heater arrangement;
removing the first heater arrangement and the second heater arrangement from the mold space between the front mold half and the rear mold half;
moving at least one of the front mold half and the rear mold half towards each other in a closing direction of the mold;
bringing the skin layer of the decorative cover sheet into contact with the textured front mold surface;
forming into the skin layer a textured skin surface produced from the textured front mold surface while the substrate is located between the front mold half and the rear mold half;
pressing the substrate against the adhesive layer of the decorative cover sheet; and
bonding the decorative cover sheet to the substrate with the adhesive layer of the decorative cover sheet.

2. The method of claim 1 wherein:
forming the skin layer of the decorative cover sheet into contact with the textured front mold surface and forming into the skin layer the textured skin surface produced from the textured front mold surface are performed while applying a vacuum to the mold cavity with the front mold half.

3. The method of claim 2 wherein:
after forming into the skin layer the textured skin surface produced from the textured front mold surface, terminating the vacuum applied to the mold cavity with the front mold half and applying pressurized air in excess of atmospheric air pressure to the mold cavity with the front mold half before moving at least one of the front mold half and the rear mold half away from each other in an opening direction.

4. The method of claim 3 wherein:
while applying pressurized air in excess of atmospheric air pressure to the mold cavity with the front mold half, applying a vacuum to the mold cavity with the rear mold half before moving at least one of the front mold half and the rear mold half away from each other in an opening direction.

5. The method of claim 1 wherein:
the clamping arrangement includes a plurality of clamps wherein each of the clamps is arranged to apply a clamping force to the decorative cover sheet; and
wherein the clamping force to be applied by each of the clamps to the decorative cover sheet is adjustable independent of the clamping force of each of the other clamps.

6. The method of claim 1 wherein:
the clamping arrangement includes a plurality of clamps wherein each of the clamps applies a clamping force to the decorative cover sheet; and wherein the clamping force of at least one of the clamps is adjusted while forming the skin layer of the decorative cover sheet into contact with the textured front mold surface.

7. The method of claim 1 wherein:
the clamping arrangement includes a plurality of clamps wherein each of the clamps is arranged to apply a clamping force to the decorative cover sheet; and
wherein at least one of the clamps is moveable relative to the decorative cover sheet to adjust tension of the decorative cover sheet.

8. The method of claim 1 wherein:
the clamping arrangement includes a plurality of clamps wherein each of the clamps applies a clamping force to the decorative cover sheet; and
wherein at least one of the clamps is moved relative to the decorative cover sheet while forming the skin layer of the decorative cover sheet into contact with the textured front mold surface.

9. The method of claim 1 wherein:
the clamping arrangement comprises an annular frame assembly which surrounds the mold.

10. The method of claim 9:
the front mold half and the rear mold half of the mold are mounted within a molding press to open and close the mold; and
the annular frame assembly is mounted within the molding press without being mounted to the front mold half or the rear mold half of the mold.

11. The method of claim 9 wherein:
the mold has an opening direction and a closing direction; and
the annular frame assembly is movable in a same direction as either the opening direction or the closing direction of the mold independent of the mold.

12. The method of claim 9 wherein:
the annular frame assembly is movable in a direction substantially transverse to a parting line of the mold.

13. The method of claim 9 wherein:
the annular frame assembly includes an annular frame body and a plurality of clamps wherein each of the clamps is arranged to apply a clamping force to the decorative cover sheet; and
each of the plurality of clamps comprises a clamping member, wherein the clamping member is arranged to clamp the decorative cover sheet in the presence of the clamping force applied to the clamping member.

14. The method of claim 13 wherein:
each of the plurality of clamps comprises a movable cylinder to provide the clamping force.

15. The method of claim 13 wherein:
each of the plurality of clamping members comprises at least one adjustable stop to adjust the clamping force applied to the decorative cover sheet.

16. The method of claim 13 wherein:
each of the plurality of clamping members is mounted to the annular frame body and arranged to pivot relative to the annular frame body during clamping of the decorative cover sheet and unclamping of the decorative cover sheet.

17. The method of claim 13 wherein:
each of the plurality of clamping members is mounted to a movable section of the annular frame assembly such that each of the plurality of clamping members is movable in a direction towards the mold and a direction away from the mold.

18. The method of claim 13 wherein:
each of the plurality of clamping members is mounted to a movable section of the annular frame assembly such that each of the plurality of clamping members is movable in a direction substantially perpendicular to either an opening direction of the mold or a closing direction of the mold.

19. The method of claim 18 wherein:
each movable section of the annular frame assembly is movable by a movable cylinder.

20. The method of claim 1 further comprising:
moving the clamping arrangement and the decorative cover sheet towards the front mold half as the front mold half and the rear mold half move towards each other in the closing direction.

21. The method of claim 20 further comprising:
after moving the clamping arrangement and the decorative cover sheet towards the front mold half as the front mold half and the rear mold half move towards each other in the closing direction, holding the clamping arrangement stationary as the front mold half and the rear mold half continue to move towards each other in the closing direction.

22. The method of claim 1 wherein:
the substrate front surface includes an adhesive layer; and
heating the substrate front surface with the second heater arrangement further comprises heating the adhesive layer of the substrate front surface with the second heater arrangement; and
bonding the decorative cover sheet to the substrate with the adhesive layer of the decorative cover sheet and the adhesive layer of the substrate front surface.

23. A method of forming a decorative article comprising:
providing a mold comprising a front mold half and a rear mold half to form the decorative article, the front mold half comprising a mold cavity and a front mold surface, the front mold surface comprising a textured front mold surface;
arranging the mold such that a mold space is provided between the front mold half and the rear mold half;
placing a substrate on the rear mold half, the substrate having a substrate front surface including an adhesive layer, and wherein the substrate has a three dimensional shape formed in another mold prior to being placed on the rear mold half;
placing a decorative cover sheet in the mold space between the front mold half and the rear mold half, the decorative cover sheet comprising an untextured skin layer and a cushion foam layer;
retaining the decorative cover sheet with a clamping arrangement, the decorative cover sheet oriented in the clamping arrangement such that the skin layer faces the textured front mold surface;
introducing a first heater arrangement and a second heater arrangement in the mold space between the front mold half and the rear mold half, the first heater arrangement located between the front mold half and the decorative cover sheet and the second heater arrangement located between the decorative cover sheet and the rear mold half;
heating the textured front mold surface of the front mold half and the skin layer of the decorative cover sheet with the first heater arrangement;
heating the decorative cover sheet and the substrate front surface including the adhesive layer with the second heater arrangement;

removing the first heater arrangement and the second heater arrangement from the mold space between the front mold half and the rear mold half;

moving at least one of the front mold half and the rear mold half towards each other in a closing direction of the mold;

bringing the skin layer of the decorative cover sheet into contact with the textured front mold surface;

forming into the skin layer a textured skin surface produced from the textured front mold surface while the substrate is located between the front mold half and the rear mold half;

pressing the substrate including the adhesive layer against the decorative cover sheet; and bonding the decorative cover sheet to the substrate with the adhesive layer of the substrate.

* * * * *